Aug. 20, 1968    F. JEITNER ET AL    3,398,052
NUCLEAR FUEL ELEMENT

Filed Nov. 10, 1965    2 Sheets-Sheet 1

United States Patent Office 3,398,052
Patented Aug. 20, 1968

3,398,052
NUCLEAR FUEL ELEMENT
Franz Jeitner, Karl Reinhart, and Jürgen Semmler, Meitingen uber Augsburg, Germany, assignors to Arbeitsgemeinschaft Versuchs-Reaktor AVR G.m.b.H., Dusseldorf, Germany, a corporation of Germany
Filed Nov. 10, 1965, Ser. No. 507,144
Claims priority, application Germany, Feb. 12, 1965, A 48,383
20 Claims. (Cl. 176—71)

ABSTRACT OF THE DISCLOSURE

A spherical nuclear reactor fuel element. The spherical body of moderator material has an inner hollow of rounded shape concentric to the spherical surface for receiving nuclear fuel. An insert rod of moderator material is disposed in the hollow. The rod has a longitudinal axis and a surface symmetrical with respect to the axis and forms with the spherical body a ring-shaped interspace also symmetrical with respect to the axis.

---

Figure 1:
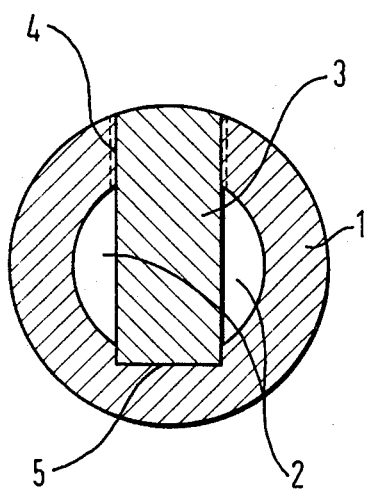

Our invention relates to nuclear fuel elements in which the fissionable material, such as nuclear fuel and/or breeder substance, is contained inside a spherical body of moderator material, particularly graphite.

Spherical fuel elements for nuclear reactors, thus composed of fissionable material and moderator material are known as such. The fissionable material, namely nuclear fuel and/or breeder substance, is accommodated in recesses or hollow spaces of the spherical moderator body. As a rule, the hollow space for the fissionable material is located in the center of the sphere. Such fuel elements are readily producible and have higher mechanical strength than other known fuel elements whose hollow spaces for accommodating the fissionable material are located near the surface of the element body. On the other hand, placing the fissionable material near the surface of the sphere has the advantage of simplifying the cooling operation.

It is therefore an object of the invention to provide a spherical fuel element that, on the one hand, has a hollow space for receiving the fissionable material in the vicinity of the spherical surface and, on the other hand, neither impairs the mechanical strength of the moderator sphere nor appreciably aggravates the manufacture of such spherical fuel elements.

To achieve these objects, and in accordance with a feature of our invention, we provide a spherical body of moderator material with a hollow of substantially spherical or ellipsoidal shape concentric to the spherical surface, and diametrically insert into the body and through the hollow a rotationally symmetrical rod of moderator material so as to leave a rotationally symmetrical interspace between the insert rod and the inner wall surface of the spherical body.

For further elucidating the invention, reference will be made to the embodiments of nuclear fuel elements according to the invention shown by way of example on the accompanying drawings, in which:

FIGS. 1 to 8 illustrate in diametrical cross section eight different examples. The same reference numerals are used in all of these illustrations for functionally corresponding components, respectively.

According to FIG. 1, the envelope structure of the nuclear fuel element consists of a sphere 1 of moderator material, preferably graphite, which possesses a likewise spherical and concentrical hollow space 2. Inserted into the hollow 2 is a cylindrical rod 3, likewise made of moderator material such as graphite. The rod 3 is inserted through the filler opening 4 of the envelope structure 1 and also serves as a plug tightly closing the opening 4. For this purpose, the upper part of the insert rod 3 and the opening 4 of the envelope structure 1 are provided with mutually engaging screw threads. The moderator sphere 1 is further provided with a circular recess 5 in its inner wall diametrically opposite to the opening 4, and the rod 3 has its lower end inserted into the recess 5.

Figure 2:
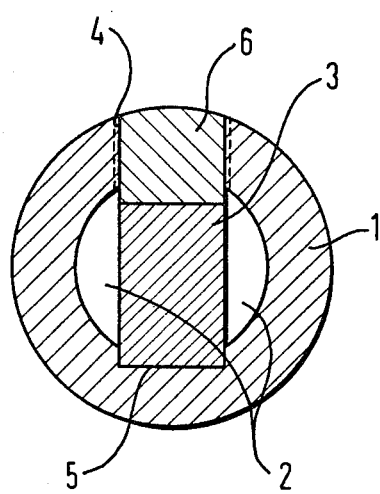

In the embodiment shown in FIG. 2, a closure plug 6 separate from the rod 3 is provided for tightly closing the opening 4 in the envelope 1. The plug preferably consists of the same material as the hollow spherical body 1.

Figure 3:
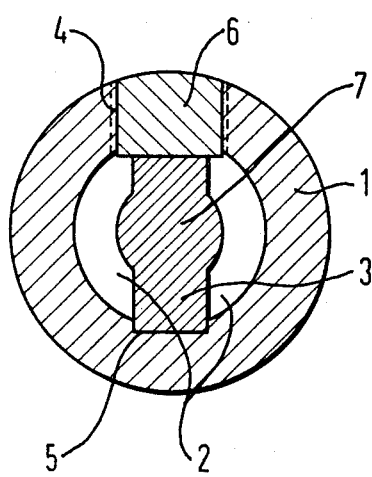

In the embodiment according to FIG. 3, the inserted rod 3 is given a modified shape. It has a substantially spherical portion 7 located in the center of the hollow sphere 1. This secures a still more uniform distribution of the fissionable material within the rotationally symmetrical interspace 2, with respect to the surface of the spherical body 1.

Figure 4:
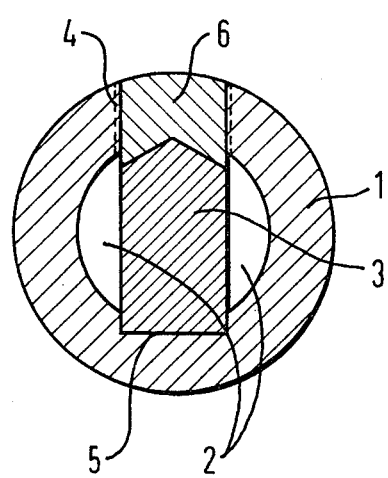

The filling of fuel or breeder material into the hollow interspace 2 of the element is facilitated by giving the top portion of the insert rod 3 a conical shape as shown in FIG. 4. In this case, it is preferable to provide the plug 6 on its inner side with a conical cavity mating the conical top of the rod 3 by forming the same angle at the apex.

Figure 5:
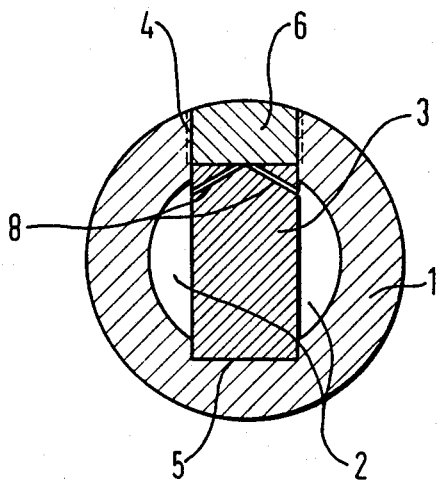

However, the filling of fissionable substance into the inner space 2 may also be facilitated according to FIG. 5 by providing the top portion of the inserted moderator rod 3 with inclined bores 8 extending from the top face downwardly into the interstitial hollow 2.

Figure 6:
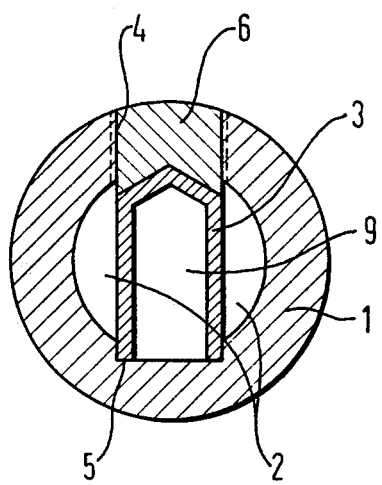

To prevent mechanical tension from occurring within the nuclear fuel element on account of differences in thermal expansion of the fissionable material and the moderator material forming the envelope, the insert rod 3 may be provided with a hollow space 9 as shown in FIG. 6.

Figure 7:
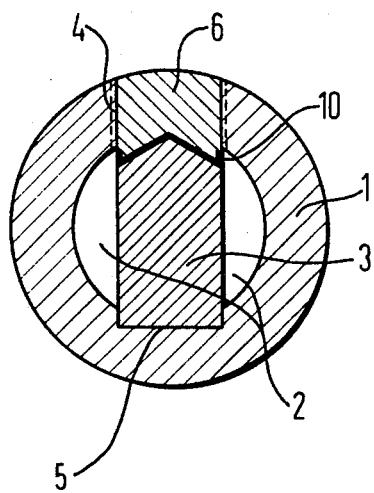

For sealing the interstitial fuel space 2 at the closure plug 6, or for providing a tight seal between plug 6 and insert rod 3, it is preferable to provide a gasket or seal consisting of carbon-felt or carbon-weave material 10, as is shown in FIG. 7.

Figure 8:
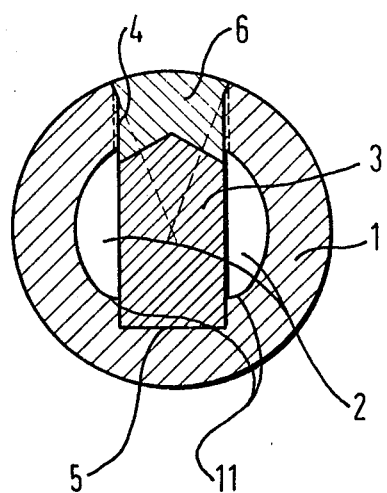

FIG. 8 illustrates further means for increasing the mechanical strength of the spherical fuel element. Thus it has been found useful to give the closure plug 6 a conical shape on its diametrically outer portion, and to provide the opening in the hollow sphere 1 with a corresponding conical portion mating that of the plug. By shaping the respective cones in such a manner that the respective apexes are coincident with the center of the sphere, the line of separation between the plug 6 and the hollow spherical body 1 forms an angle of 90° with the periphery of the sphere, relative to the illustrated cross section. This secured maximal strength at the plug locality. It has further been found preferable to increase the wall thickness of the hollow spherical body 1 at the inner localities opposite the opening 4, so that the opposite side is not excessively weakened by the recess 5. That is, preferably the wall thickness of the hollow sphere 1 is increased around the recess 5 in the immediate vicinity 11 thereof. A similar thickening of the wall is also of advantage near the opening 4.

A spherical fuel element designed according to the invention is not only distinguished by considerably increased mechanical strength, but also by a favorable arrangement of the fuel or breeder material within the sphere with respect to optimal cooling possibilities. The invention further affords providing hollow spaces of relatively large volume; and it is relatively easy to take the fissionable material out of the spherical structure, such as for regenerative purposes. It has also been found advantageous that the diameter of the closure plug can be made smaller than the largest diameter of the annular hollow space for receiving the fissionable material. This, on the one hand, secures the desired high mechanical strength of the spherical fuel element and, on the other hand, affords providing a sufficiently large hollow space.

Nuclear fuel elements according to the invention are applicable to particular advantage for use with fuels in the form of so-called coated articles, for example fissionable particles coated with pyrolytic graphite. The moderator material of the hollow spherical body, as well as of the inserted rod and the closure plug, may also consist of beryllium oxide or beryllium carbide, although graphite has been found preferable in most cases.

We claim:

1. A nuclear fuel element, comprising a spherical body of moderator material having an inner hollow of rounded shape concentric to the spherical surface for receiving a supply of nuclear fuel, and an insert rod of moderator material disposed in said hollow, said rod having a longitudinal axis and a surface symmetrical with respect to said axis and forming with said body a ring-shaped interspace also symmetrical with respect to said axis.

2. In a nuclear fuel element according to claim 1, said spherical body consisting of graphite.

3. In a nuclear fuel element according to claim 1, said hollow in said spherical body having substantially spherical shape.

4. In a nuclear fuel element according to claim 1, said hollow in said spherical body having substantially ellipsoidal shape.

5. In a nuclear fuel element acording to claim 1, said insert rod being cylindrical.

6. In a nuclear fuel element acording to claim 1, said insert rod having a substantially spherical bulge at the center of said hollow spherical body.

7. In a nuclear fuel element according to claim 1, said insert rod being hollow.

8. In a nuclear fuel element according to claim 1, said spherical body having an opening, said insert rod extending through said opening and forming a plug which closes said opening.

9. In a nuclear fuel element according to claim 8, said opening having a screw thread, and said insert rod having a threaded portion engaging said screw thread of said opening.

10. In a nuclear fuel element according to claim 1, said spherical body having an opening, and a plug disposed in said opening and coaxially adjacent to said insert rod, said plug closing said opening.

11. In a nuclear fuel element according to claim 10, said insert rod forming a cone at its end adjacent to said opening, and said plug having a conical cavity engaged by said cone.

12. In a nuclear fuel element according to claim 10, said insert rod having outwardly inclined bores extending from its top to said interspace to facilitate filling fissionable material into said interspace.

13. In a nuclear fuel element according to claim 10, the largest diameter of said insert rod being smaller than the diameter of said opening.

14. In a nuclear fuel element according to claim 10, said bore and said plug having near the surface of said spherical body respective conically shaped portions which widen in the radially outward direction.

15. In a nuclear fuel element according to claim 14, said conically shaped portions having a common apex substantially coinciding with the center point of said spherical body.

16. In a nuclear fuel element according to claim 1, said spherical body having an opening and having a recess located in the interior diametrically opposite to said opening, said insert rod extending coaxially to said opening and said recess and being seated in said recess.

17. In a nuclear fuel element according to claim 16, said spherical body having increased wall thickness around said recess.

18. In a nuclear fuel element according to claim 1, said interspace being filled with fissionable material and having sealing means of compressible carbon material.

19. In a nuclear fuel element according to claim 1, said insert rod consisting of graphite.

20. In a nuclear fuel element according to claim 10, said plug consisting of graphite.

References Cited

UNITED STATES PATENTS

| | | | |
|---|---|---|---|
| 3,079,316 | 2/1963 | Johnson | 176—91 X |
| 3,098,809 | 7/1963 | Huet | 176—91 X |
| 3,135,665 | 6/1964 | Koutz et al. | 176—91 X |
| 3,142,626 | 7/1964 | Wellborn | 176—90 X |
| 3,151,037 | 9/1964 | Johnson et al. | 176—91 X |
| 3,212,989 | 10/1965 | Fitzer et al. | 176—91 X |
| 3,284,314 | 11/1966 | Rachor et al. | 176—90 X |
| 3,346,462 | 10/1967 | Engel et al. | 176—90 X |

FOREIGN PATENTS

| | | |
|---|---|---|
| 621,315 | 5/1961 | Canada. |
| 1,320,338 | 1/1963 | France. |
| 1,096,513 | 1/1961 | Germany. |
| 983,590 | 2/1965 | Great Britain. |

OTHER REFERENCES

Nuclear Power, March 1961, page 84.

CARL D. QUARFORTH, *Primary Examiner.*

BENJAMIN R. PADGETT, *Examiner.*

M. J. SCOLNICK, *Assistant Examiner.*